United States Patent

McKinnon

[15] 3,675,303

[45] July 11, 1972

[54] HOSE HOLDER AND COUPLING INSERTER MACHINE

[72] Inventor: Benjamin I. McKinnon, Atlanta, Ga.

[73] Assignee: Equipment Sales Company, Inc., Atlanta, Ga.

[22] Filed: Oct. 28, 1969

[21] Appl. No.: 871,837

[52] U.S. Cl. ............................................. 29/237, 269/131
[51] Int. Cl. ........................................................ B23p 19/04
[58] Field of Search .................. 29/237, 238, 239; 269/131

[56] References Cited

UNITED STATES PATENTS

| 2,676,391 | 4/1954 | Elder | 29/237 X |
| 2,916,812 | 12/1959 | Milo | 29/237 |
| 3,480,270 | 11/1969 | Gill | 269/131 |

Primary Examiner—Andrew R. Juhasz
Assistant Examiner—Leon Gilden
Attorney—Cushman, Darby & Cushman

[57] ABSTRACT

An apparatus is described which grips the circumference of a hose or the like and holds same to allow a coupling or the like to be inserted therein or otherwise attached thereto. A flexible, web-like material is used as a means of constricting the longitudinal movement of the hose; the web-like material is tightened around a major portion of the circumference of the hose, gripping it tightly. A thruster means is provided for forcing the coupling into an end of the hose. The thruster is mounted on a movable carriage which will allow it to be properly positioned in order to accommodate the length of hose and the length of coupling being used.

8 Claims, 4 Drawing Figures

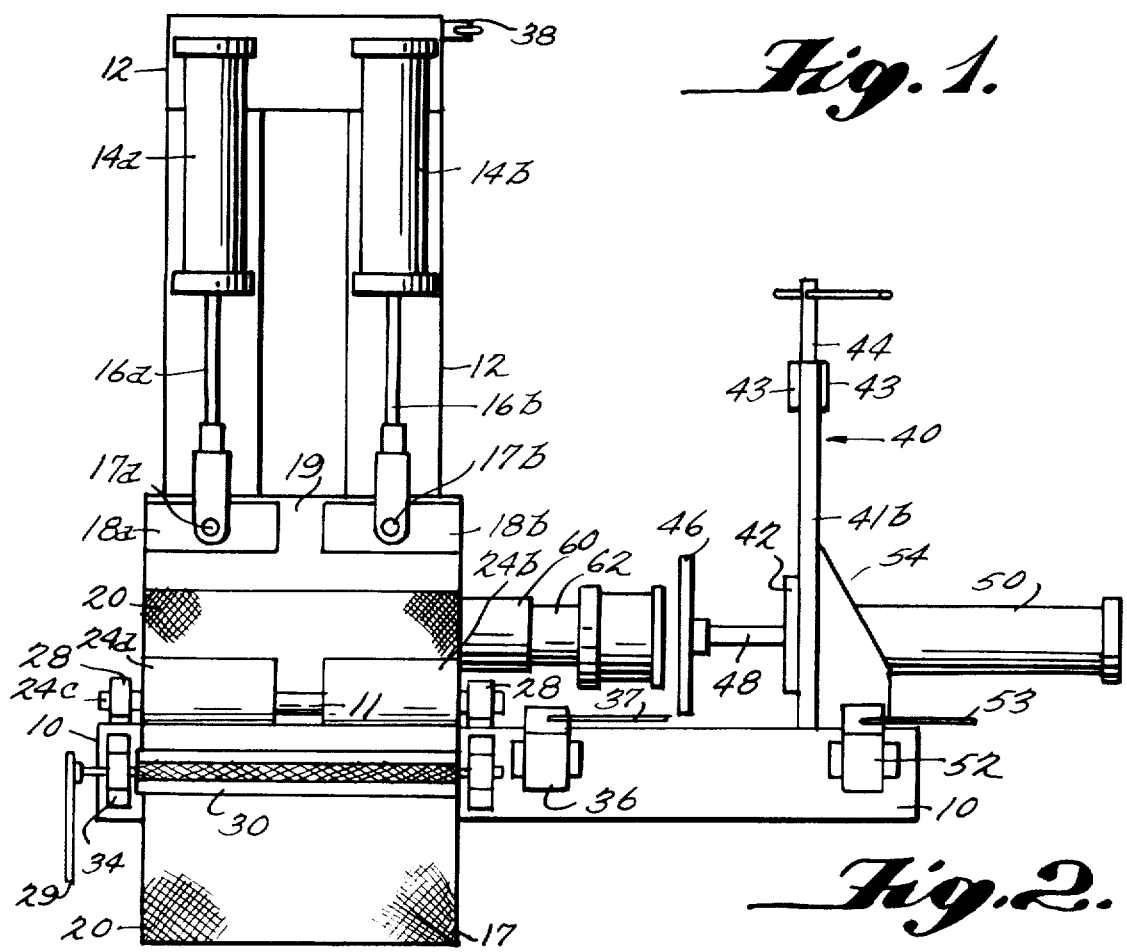
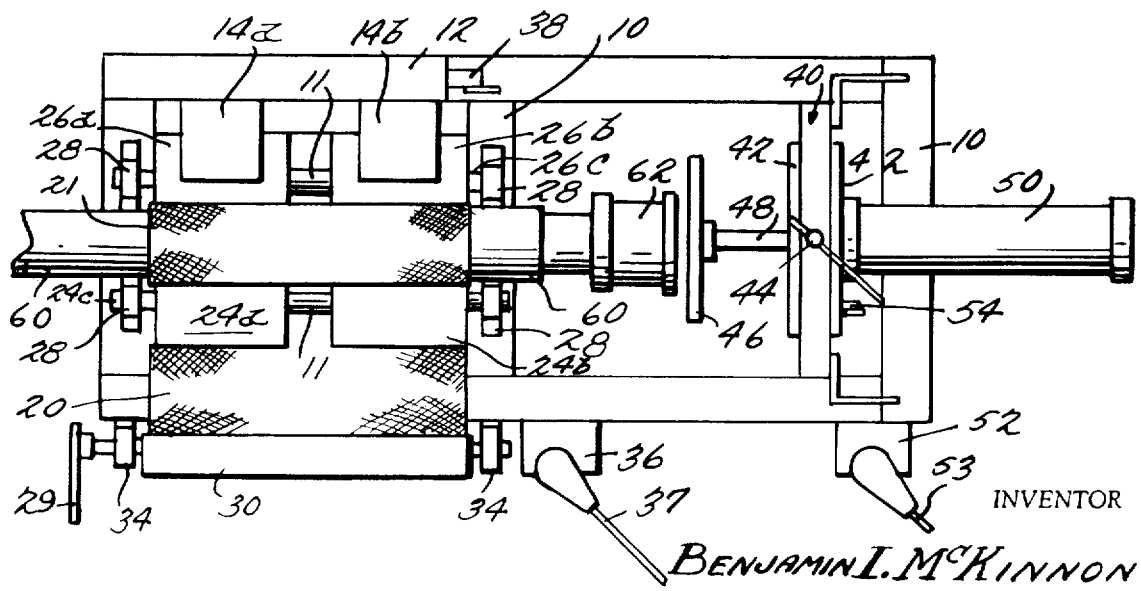

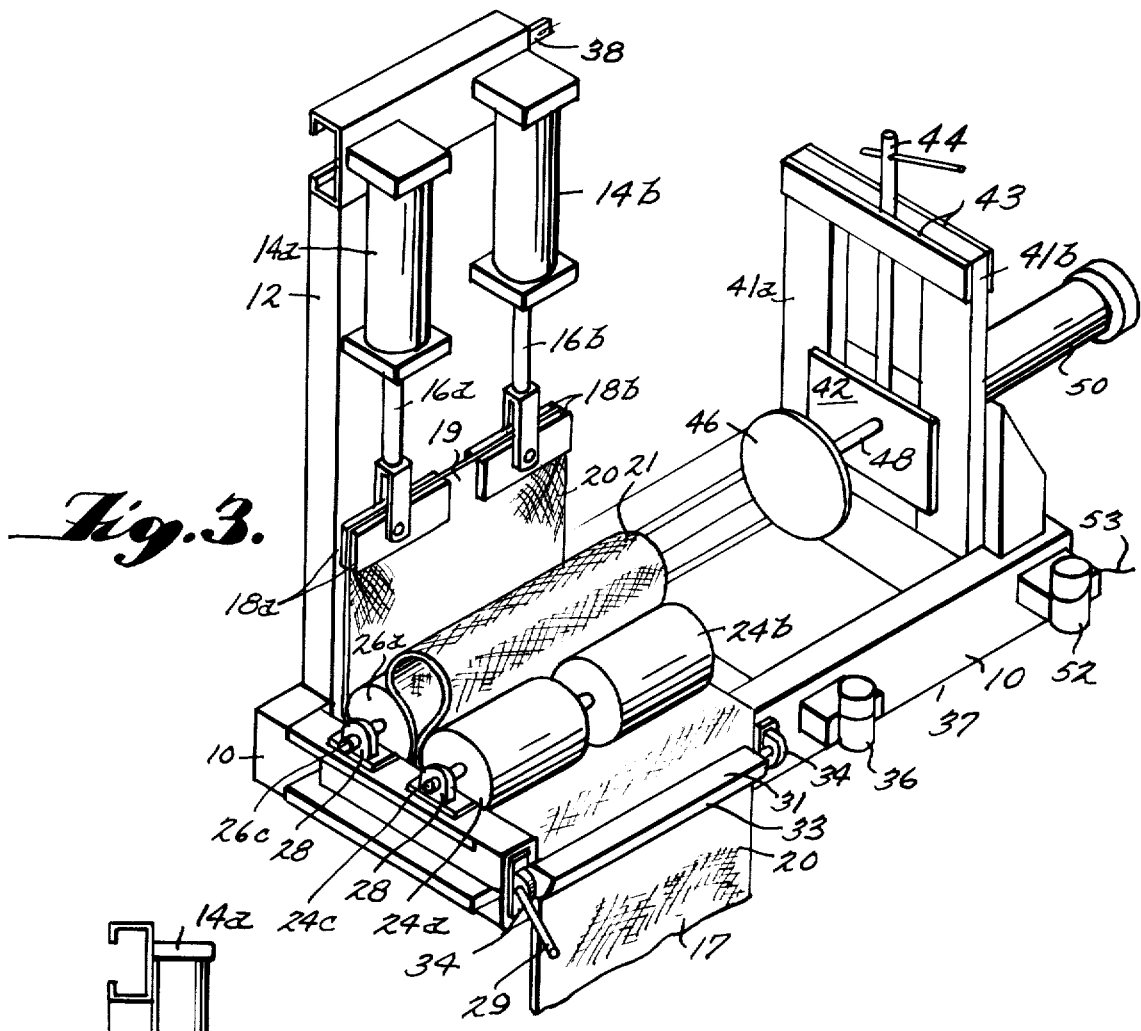
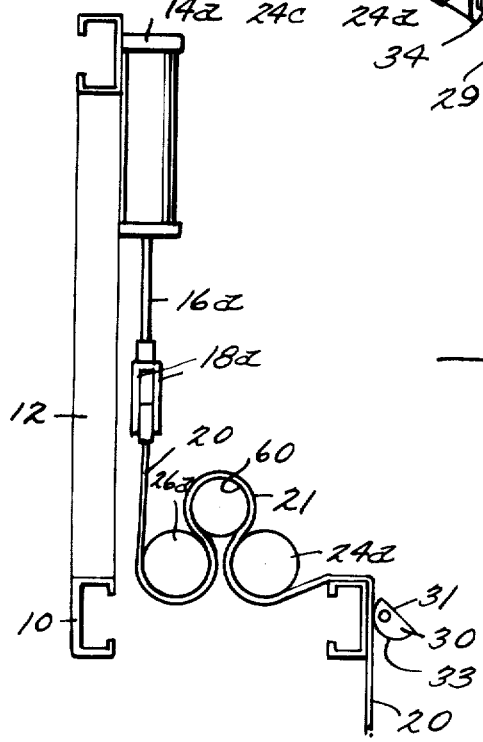

HOSE HOLDER AND COUPLING INSERTER MACHINE

This invention relates to apparatus for holding a hose or a like tubular element securely and evenly around substantially the entire periphery thereof in a stiffened straight-line configuration in order to facilitate the insertion of couplings or fittings into an open end thereof.

In using hose, tubing or the like, it is often necessary to secure thereto fittings or couplings which may be used to connect the hose or tubing to other hose or tubing or to other machinery with which the hose or tubing is to be used. Normally, such hose or tubing is supplied without such fittings or couplings mounted thereon. It is, therefore, necessary for the user of the hose or tubing or the supplier of the machinery with which the hose or tubing is to be used to provide and attach to the hose or tubing the proper fitting or coupling.

Heretofore, it has been customary for fittings and couplings of various descriptions to be inserted into or otherwise attached to hose or tubing by manually operated means. That is, the hose or tubing is generally clamped in a vise or like device which holds the hose only at fixed points around its periphery and the coupling or fitting is forced therein by an exertion of pressure by the operator. This exertion of pressure may be accomplished in the prior art devices by manually turning a handle which threads said handle down against a pusher plate, forcing the coupling or fitting into the hose. Such devices are often provided with mandrels of a size corresponding to the inner diameter of the hose so that the mandrel may be forced into the hose ahead of the coupling opening the hose to its full diameter to decrease the effort required to force the coupling therein. Despite the use of such devices, it is necessary for the operator to exert a large amount of force on the tool in order to force the coupling into or to be otherwise engaged with the hose or tubing. Further, a supply of mandrels must be at hand in order to accommodate the various sizes of hoses encountered. In placing the hose in the vise in order to hold it in position for the engagement of a coupling therewith, especially with flexible hosing, there is a danger that the hose will be damaged, because the opposing forces exerted by the vise on the hose are entirely exerted at only a few, usually two, points on the periphery of the hose. Thus, it can be seen that if a great deal of pressure is required to force a coupling into a hose, this force may also cause the vise to tear or otherwise damage the surface of the hose. This latter problem becomes more acute as the diameter or width of the hose or tubing being used increases. In addition it can be seen that the use of only a few gripping points on a hose or the like of a flexible material will alter the shape of the hose making it even more difficult to place a coupling in engagement therewith.

It is therefore an object of this invention to provide an apparatus for holding hose, tubing or the like, in a manner such that it is held securely and evenly around a major portion of the periphery thereof in a stiffened, straight-line configuration without deforming the cross-sectional shape of said hose or tubing in order to facilitate the attachment thereto or insertion therein of couplings and fittings.

It is another object of this invention to provide a hose holding and coupling inserting apparatus meeting the above object in which the inwardly directed gripping forces acting on the hose or tubing are of substantially an equal magnitude around substantially the entire periphery of the hose or tubing.

A further object of this invention is to provide apparatus meeting the above objects in which rapid and precise control of the amount of gripping force exerted on the hose or tubing may be achieved.

Still another object of this invention is to provide a hose holding and coupling inserting machine in which a wide range of diameters or widths of hose or tubing may be accommodated.

The aforementioned and other objects may be achieved by utilizing the invention fully described hereinbelow.

The principles of this invention may be best understood by reference to the description of a preferred embodiment of the invention given hereinbelow in conjunction with the drawings in which:

FIG. 1 is a side-elevation of a preferred embodiment constructed according to the principles of this invention shown as gripping a section of hose in which a fitting is about to be inserted;

FIG. 2 is a top elevation of the machine illustrated in FIG. 1;

FIG. 3 is an isometric view of the preferred embodiment illustrated in FIGS. 1 and 2, in which the constrictor is formed to receive a hose, but from which a hose is absent in order to more clearly illustrate the structural details of the invention, and FIG. 4 is a fragmentary, sectional view taken along the lines 4—4 in FIG. 2, illustrating the manner in which the constrictor exerts a gripping force on the hose and the structural relationship of the constrictor with the gripping rollers, the pneumatic cylinders which exert a pulling force and the anchor means which hold the constrictor.

A preferred embodiment of the invention is described hereinbelow with reference to FIGS. 1–4, and these Figures in which like numerals refer to like elements should be referred to simultaneously.

The apparatus in these figures is structurally supported by means of a main frame comprised of a horizontal frame structure 10 and a vertical frame structure 12. In the preferred embodiment, the frame elements are constructed of welded steel channels with cross members and masts as needed to support working parts of the machine.

Mounted on the vertical frame structure 12 are pneumatic cylinders 14a and 14b. The pneumatic cylinders operate in the well-known manner; that is, a fluid pressure may be introduced into the cylinders and will act on the surfaces of pistons (not shown) in the cylinders thereby either raising or lowering the piston rods 16a and 16b. The pneumatic cylinders 14a and 14b are of the double acting type or the type in which a fluid pressure may be introduced on either side of the piston to cause the piston to operate in either direction within the cylinder. It is to be noted that while pneumatic cylinders are used in this preferred embodiment, any suitable device for obtaining a mechanical advantage may be used, e.g. screw and nut devices, tooth and ratchet jacks and windlass or the like may be used. The piston rods 16a and 16b are attached at the ends thereof remote from the pneumatic cylinders to draw blocks 18a and 18b, respectively. The draw blocks 18a and 18b are each, respectively comprised of a pair of such blocks between which are sandwiched a constrictor element 20. Each of the pairs of draw blocks are merely matching steel plates bolted together at 17a and 17b, respectively, to distribute draw tension on constrictor element 20.

Constrictor element 20 in the preferred embodiment is a flat, flexible sheet of high tensile strength with at least one side thereof having a surface which resists slippage. In the preferred embodiment conventional conveyor belting is used, but any type of material which meets the foregoing requirements may be used as well. As mentioned above, an end 19 of constrictor 20 is sandwiched between draw block 18a and 18b so that upward motion of the piston rods 16a and 16b will pull the end 19 of the constrictor 20 upwardly.

A pair of shafts 24c and 26c are placed in a parallel relationship in a horizontal plane and mounted on frame structure 10 by means of pillow block bearing mounts 28. On each of these shafts are mounted a pair of grip rollers 24a–b and 26a–b, respectively. The pair of rollers on each shaft are separated by a spacer 11, which is merely tubing slipped over the shaft. Each of the grip rollers are cylindrically shaped members which in the preferred embodiment are fabricated of steel, but any such suitable material may be used. The grip rollers 24a–b and 26a–b are rotatably mounted on shafts 24c and 26c, respectively, and the constrictor 20 is placed beneath the lower surfaces of the grip rollers with a portion 21 extending upwardly between shafts 24c and 26c outwardly of the roller to form a loop. The surface of the constrictor 20 adjacent the grip rollers 24 and 26 is roughened to resist slippage of the constrictor when it bears against the grip rollers. An anchor cam 30 is rotatably mounted by means of pillow bearing mounts 34 on a side of the frame structure 10 remote from the frame structure 12 so as to bear against end 17 of the constrictor 20. Anchor cam 30 is comprised of a flatted surface 31 and a rounded surface 33, and it may be rotated by means of handle 29 to bring one of the foregoing surfaces adjacent the constrictor 20. As best shown in FIG. 3, rotation of handle 29 in a clockwise direction will bring the rounded surface 33 of cam 30 adjacent the constrictor 20 and the surface 33 will provide an increasing pressure against the constrictor 20 as this rotation of handle 29 takes place. As the piston rods 16a and 16b are moved upwardly, the draw tension on the constrictor 20 will be increased, and the friction between the constrictor 20 and the cam 30 will cause further rotation of the anchor cam further increasing the pressure of the surface 33 of the anchor cam 30 on constrictor 20 against the adjacent portion of the frame structure 10. Thus, the end 17 of constrictor 20 is securely anchored so that an increase of draw tension on end 19 of the constrictor 20 will not merely pull the constrictor 20 through the rollers, but will tend to decrease the diameter of loop 21 of constrictor 20 increasing the gripping pressure exerted by the loop in a manner to be described more fully hereinbelow. Anchor cam 30 may be released by merely rotating handle 29 in a counterclockwise direction placing the flat surface 31 adjacent the constrictor 20.

A draw control valve 36 operated by a handle 37 is shown mounted on frame structure 10. This valve is of the well-known variety which provides pneumatic pressure control of the pressure in cylinders 14a and 14b. The valve 36 provides continuous control throughout the full range from zero to the full available supply pressure by movement of handle 37 through a 90° arc of travel. The pressure from valve 36 enters cylinders 14a and 14b at the rod end so that operation of this valve controls the amount of draw tension exerted on the constrictor 20 by piston rods 16a and 16b. A tension relaxer valve 38, shown mounted on the upper portion of frame structure 12, is adapted to apply a pressure to the top of the piston surface in draw cylinder 14b. Application of pressure to this piston surface relaxes the gripping pressure by loop 21 on the side thereof acted upon by piston rod 16b, while the other side of the constrictor is firmly held by piston rod 16a. Valve 38 may be a three-way air valve of any of the conventional types available.

An upright frame structure 40, hereinafter referred to as the thrust frame, is attached to and braced from the horizontal portion of the main frame structure 10. The thruster frame is basically comprised of two upright steel bars 41a and 41b with horizontal steel tie plates 43 being bolted through the bars to form a rigid, rectangular frame structure. Between the bars 41a and 41b, a thruster carriage 42 is provided which is slidably movable throughout the vertical length of the space defined between the bars 41a and 41b. The thruster carriage may be a steel block of a thickness corresponding to the thickness of the bars 41a and 41b and having a width equal to the width of the space defined between the bars. Steel plates exceeding the width of the aforementioned space are bolted to each side of the steel block to form therewith the sliding carriage arrangement, but any other suitable means may be used. A positioner screw 44 extending from the top center of thrust carriage 42 and attached to the tie plate 43 at the top of the thruster frame provides a means for raising or lowering the thruster carriage in the well-known manner by merely turning the screw 44. The center of the thruster carriage is bored to receive a piston rod 48 having attached to an end thereof a flat steel plate contact element forming the thruster plate 46. At the opposite end of piston rod 48, a piston (not shown) is attached and placed within a double acting pneumatic cylinder 50 of the type described hereinabove. It is to be noted again that the power source for the operation of thruster plate 46 may be of any other type, such as those described hereinabove. A thruster control valve 52, operated by handle 53, is provided to control the amount of pneumatic pressure entering the top of the piston end of pneumatic cylinder 50. This valve thereby provides a continuous control of the amount of pressure exerted by thruster plate 46 on a coupling which is being attached to or inserted in a hose or similar tubular element. In addition, a thruster return valve 54 is provided which is adapted to apply a pressure to the rod end of the piston in pneumatic cylinder 50. This three-way air valve acts to return the thruster plate to its retracted or starting position. Further, it is to be noted that this pressure applied by valve 54 could also be used to control the force necessary to remove couplings or the like from a hose when the invention is being used for this purpose rather than placing couplings in engagement with the hose.

Having described the structural details of a preferred embodiment of the hose holder and coupling inserter apparatus constructed according to the principles of this invention, the principles of operation of the preferred embodiment will now be described.

As best shown in FIG. 4, a hose 60 in which a coupling 62 is to be inserted may be placed within the loop 21 formed in constrictor 20. The diameter of the loop 21 may be quickly and conveniently adjusted when the anchor cam 30 is in its unlocked position, or in the position when surface 31 thereof is adjacent the constrictor 20. After the hose 60 has been inserted within loop 21, the loop is reduced in size by exerting a pulling force or draw tension on the end 19 of constrictor 20 until a snug fit of the constrictor around the hose is obtained. At this point, the anchor cam 30 is rotated to place surface 33 in contact with the end 17 of constrictor 20 to clamp the constrictor against the frame structure 10.

Draw control valve 36 is operated to apply air pressure to the rod ends of the cylinders 14a and 14b to draw the loop 21 in constrictor 20 around the major portion of the circumference of the hose 60. Further, the draw tension exerted on constrictor 20 by means of piston rods 16a and 16b serves to pull the constrictor firmly against the grip rollers 24a-b and 26a-b the shafts of which, 24c and 26c, are placed a distance apart less than the width of the hose. Thus, operating valve 36 when used to increase the amount of pressure directed to cylinders 14a and 14b will serve to increase the amount of gripping pressure or squeeze on the hose 60 as well as increasing the amount of pressure exerted by the constrictor 20 on the grip rollers. It is to be noted that the gripping pressure exerted by loop 21 of constrictor 20 on the hose is of substantially an equal magnitude around substantially the entire circumference of the hose 60 and throughout the full width of the constrictor 20. The hose 60 is held firmly in a non-deformed straight-line configuration to receive a coupling 62 which is to be inserted therein. There will be a significant amount of friction between the hose 60 and the surface of the constrictor 20 in engagement therewith so that said friction force will resist slipping of the hose through the constrictor. Lateral slippage of the hose 60 and constrictor 20 across the surfaces of the grip rollers is resisted by the friction between the grip rollers and the roughened surface of constrictor 20 adjacent the grip rollers. Therefore, when a significant force is exerted on coupling 62, the hose and constrictor arrangement will not merely move with the force acting on the coupling.

After the proper gripping pressure is applied to hose 60 by means of the cylinders 14a and 14b, a coupling 62 is positioned at the end of hose 60 and thruster plate 46 is operated to be brought into gentle contact with the coupling by means of the control valve 52. It is to be noted that the proper vertical alignment of thruster plate 46 with respect to coupling 62 has been accomplished by operation of thruster carriage 42 by means of positioner screw 44 in the manner described hereinabove. After thruster plate 46 is in contact with coupling 62, it may be necessary to further vertically align the thruster plate, and this operation may be accomplished in the same manner. The coupling 62 is then inserted into engagement with the interior of hose 60 by operating valve 52 to further increase the pressure on thruster plate 46 by means of cylinder 50. While this operation is being carried out, the gripping pressure exerted on hose 60 by the loop 21 and constrictor 20 may be increased, as necessary, by further operation of draw control valve 36. The two operating pressures necessary to insert the coupling into the hose, i.e. pressure needed to increase draw tension on end 19 of constrictor 20 and the pressure needed to increase the operating thrust of thruster plate 46, are in the full, instantaneous and continuous control of the operator at all times.

In some cases when the coupling is being inserted into a hose, it may be necessary to relax the pressure exerted by loop 21 of constrictor 20 on the end of the hose adjacent the coupling to allow the hose to enlarge with the insertion of the coupling. This relaxation of pressure on the coupling end of the hose may be accomplished by operating tension relaxer valve 38 to introduce air pressure into the cylinder 14b on the end thereof adjacent the top surface of the piston in the cylinder. The pressure so introduced must be sufficient to overcome the pressure on the piston rod side of the cylinder and to cause the piston rod 16b to move downwardly to decrease the gripping pressure acting on the coupling end of hose 60. While this operation is being carried out, the piston rod 16a maintains its previously set draw tension on constrictor 20 maintaining the previously set gripping pressure on the hose, at least on that portion of the hose affected by the portion of constrictor 20 held by draw blocks 18a.

After the insertion of coupling 62 has been accomplished, thruster control valve 52 is operated to reduce the air pressure in the piston end of the pneumatic cylinder 50 to zero, and thruster return valve 54 is operated to apply air pressure to the rod end of the cylinder 50 to retract piston rod 48 and thruster plate 46 to a starting position adjacent thruster carriage 42. The hose 60 with coupling 62 attached may be removed from the apparatus merely by operating draw control valve 36 to reduce the pressure in cylinders 14a and 14b to zero and by unlocking anchor cam 30 so that the loop 21 may be manually expanded to allow the hose to be pulled therefrom.

The invention, a preferred embodiment of which is described hereinabove, is useful as well for removing couplings or the like from hose or similar tubular elements. Such an operation may be accomplished in the preferred embodiment by gripping the hose within the loop 21 of constrictor 20 in the manner described hereinabove. An adapter can be provided which may be attached to thruster plate 46 and to the coupling to be removed, and air pressure is directed by valve 54 into the rod end of pneumatic cylinder 50 to provide a pulling force to remove the coupling.

The description given hereinabove of a preferred embodiment of a machine constructed according to the principles of this invention is intended to be only exemplary, and it will be apparent to those skilled in the art that modifications to or improvement of the structural elements or their arrangement may be made within the scope of the appended claims. In particular, it is intended that the description given hereinabove of a preferred embodiment operating to insert a coupling into a flexible hose is not exhaustive of the uses to which this invention may be put. That is, it is contemplated that any tubular or like element which may be gripped by constrictor 20 in the manner described hereinabove may be operated on by this invention to attach thereto or insert therein any type of coupling or fitting upon which an axial force is needed to be used to bring said fitting or coupling into engagement with said tubular element.

I claim:

1. Apparatus for coupling fittings to tubular elements comprising means for releasably gripping a tubular element around a major portion of the periphery thereof comprising a sheet of flexible material adapted to be placed around said tubular element and at least a pair of rollers having axes parallel to that of said tubular element, said rollers being disposed on opposite sides and adjacent to said tubular element, the distances between the circumferential surfaces of said rollers being less than the width of said tubular element for gripping said sheet between said tubular element and the circumferential surfaces of said rollers, and anchor means for releasably gripping said sheet near one end thereof for preventing longitudinal movement of said sheet such that a longitudinal pulling force on the end of said sheet opposite said anchor means causes the diameter of said sheet to be reduced whereby said sheet exerts a gripping pressure around a major portion of the circumference of said tubular element, first energizing means for exerting a longitudinal pulling force on said sheet, said first energizing means being adapted to permit a continuous variation of the gripping force transmitted to said sheet of flexible material, a contact plate for exerting a pressure on said fitting or the like forcing same into engagement with said tubular element and second energizing means for supplying driving energy to said thruster means.

2. The apparatus defined in claim 1 wherein said means for gripping comprises in addition at least a pair of rollers having parallel axes and adjacent circumferential surfaces, the distance between said adjacent circumferential surfaces being less than the width of said tubular element, a portion of said sheet being formed into a loop for receiving said tubular element, said loop extending outwardly from between said adjacent surfaces of said rollers with the remainder of said sheet extending around and outwardly from the surfaces of said rollers remote from said loop, and anchor means for releasably gripping said sheet near one end thereof preventing longitudinal movement of said sheet when said first energizing means exerts a longitudinal pulling force on the other end of said sheet, whereby when said first energizing means exerts a longitudinal pulling force on said other end of said sheet, the diameter of said loop will be reduced.

3. The apparatus defined in claim 1 wherein said first energizing means comprises at least one piston and cylinder arrangement with a piston rod extending outwardly therefrom and connected to said flexible sheet, said cylinder including means for receiving a driving fluid at both ends thereof.

4. Apparatus for coupling fittings to tubular elements comprising means for releasably gripping a tubular element around a major portion of the periphery thereof comprising a sheet of flexible material adapted to be placed around said tubular element such that a longitudinal pulling force on said sheet causes said sheet to exert a gripping pressure around a major portion of the circumference of said tubular element, first energizing means for exerting a longitudinal pulling force on said sheet said first energizing means being adapted to permit a continuous variation of the gripping force transmitted to said sheet of flexible material, a contact plate for exerting a pressure on said fitting or the like forcing same into engagement with said contact plate, carriage means for moving said contact plate in a plane perpendicular to the end of said tubular element to which said fitting is to be coupled, said contact plate being longitudinally movable with respect to said carriage means toward and away from said fitting by means of second energizing means, said second energizing means for supplying driving energy to said thruster means.

5. The apparatus defined in claim 4 wherein said second energizing means comprises a piston and cylinder arrangement having a piston rod extending outwardly therefrom and connected to said contact plate for imparting longitudinal motion thereto, said cylinder including a means for receiving a driving fluid at both ends thereof, and control means for continuously varying the magnitude of force exerted on said contact plate by said piston rod.

6. Apparatus for holding a tubular element and placing a fitting or the like into engagement therewith comprising a frame means, at least a pair of rollers having parallel axes and adjacent circumferential surfaces, the distance between said adjacent circumferential surfaces being less than the width of said tubular element, said rollers being rotatably mounted on said frame means, a sheet of flexible material, a portion of said sheet being formed into a loop extending outwardly from between said adjacent circumferential surfaces for receiving said tubular element with the remainder of said sheet extending around and laterally outwardly from beneath the surfaces of said rollers remote from said loop, first energizing means for exerting a pulling force on one end of said sheet extending from beneath said surface of one of said rollers in a direction causing the diameter of said loop to be reduced, first control means for continuously regulating the magnitude of said pulling force exerted by said first energizing means on said sheet, carriage means slidably mounted on said frame means for movement perpendicularly with respect to the end of said tubular element with which said fitting or the like is to be engaged, contact means mounted in said carriage for longitudinal movement therethrough toward and away from said end of said tubular element and for exerting a pressure on said fitting to be placed in engagement with said end of said tubular element, second energizing means for imparting said longitudinal motion to said contact means for providing a driving force to said contact means for exertion of pressure on said fitting, and second control means for starting and stopping said longitudinal motion and for providing a means of continuous regulation of the magnitude of the pressure exerted on said fitting by said contact means.

7. The apparatus defined in claim 6 wherein said first energizing means comprises a pair of means for exerting a pulling force on said sheet, said means being attached to opposite sides of said one end of said sheet.

8. The apparatus defined in claim 7 comprising in addition third control means for causing the one of said pair of means adjacent the end of said tubular element with which said fitting is to be engaged to reduce the pulling force said one means exerts on said sheet.

* * * * *